(12) United States Patent
Daulton

(10) Patent No.: US 7,811,503 B2
(45) Date of Patent: Oct. 12, 2010

(54) DEVICES, ASSEMBLIES, AND METHODS FOR EXTRACTING EXTRACTABLE MATERIALS FROM POLYMERIZED BIOMEDICAL DEVICES

(75) Inventor: Jay Scott Daulton, Gilroy, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 739 days.

(21) Appl. No.: 11/737,047

(22) Filed: Apr. 18, 2007

(65) Prior Publication Data

US 2008/0257389 A1 Oct. 23, 2008

(51) Int. Cl.
*B08B 3/04* (2006.01)
*B29C 71/00* (2006.01)
*B29D 11/00* (2006.01)

(52) U.S. Cl. .................... 264/344; 134/88; 134/901; 264/2.6; 206/5.1; 425/446

(58) Field of Classification Search .................. 264/1.1, 264/2.6, 340, 344; 425/808, 445, 446; 134/88, 134/901; 206/5.1
See application file for complete search history.

(56) References Cited

U.S. PATENT DOCUMENTS

| | | |
|---|---|---|
| 5,080,039 A | 1/1992 | Kanegae et al. |
| 5,094,609 A | 3/1992 | Kindt-Larsen |
| 6,207,086 B1 | 3/2001 | Schlagel et al. |
| 6,581,761 B1 | 6/2003 | Stafford et al. |
| 6,695,988 B1 * | 2/2004 | Schlagel et al. .............. 264/2.6 |
| 7,163,583 B2 | 1/2007 | Gilliard et al. |
| 2003/0222362 A1 | 12/2003 | Indra et al. |
| 2007/0035049 A1 | 2/2007 | Bruce et al. |

FOREIGN PATENT DOCUMENTS

| | | |
|---|---|---|
| JP | 5-337957 | * 12/1993 |
| WO | WO 01/32408 A2 | 5/2001 |

OTHER PUBLICATIONS

International Preliminary Report on Patentability completed Oct. 20, 2009 and mailed Oct. 29, 2009 from corresponding International Application No. PCT/US2008/060882, filed Apr. 18, 2008 (8 pages).

* cited by examiner

*Primary Examiner*—Mathieu D. Vargot
(74) *Attorney, Agent, or Firm*—Klein, O'Neill & Singh, LLP

(57) ABSTRACT

A biomedical device carrier includes multiple recesses for holding a plurality of polymerized biomedical devices, such as polymerized ophthalmic lenses, during an extraction procedure. A biomedical device extraction assembly includes multiple biomedical device carriers. The structure of the individual carriers and the arrangement of the carriers in the assembly provide sufficient extraction of an extractable component from the biomedical devices during an extraction procedure using relatively small amounts of extraction media per biomedical device. Methods of extracting biomedical devices include providing polymerized biomedical devices in the present carriers and assemblies and contacting the devices with an extraction composition.

40 Claims, 14 Drawing Sheets

DEVICES, ASSEMBLIES, AND METHODS FOR EXTRACTING EXTRACTABLE MATERIALS FROM POLYMERIZED BIOMEDICAL DEVICES

FIELD

The embodiments described herein relate to devices, assemblies, and methods for producing polymerized biomedical devices, and more specifically, to devices, assemblies, and methods for extracting extractable materials from polymerized biomedical devices, such as polymerized ophthalmic lenses, including hydrogel and silicone hydrogel contact lenses.

BACKGROUND

Polymerized biomedical devices, or biomedical devices that are the polymerization product of polymerizable chemical agents, such as monomers, oligomers, macromers, and prepolymers, often contain extractable materials such as unreacted monomers, linear oligomers, macromers, prepolymers, or combinations thereof, which can be associated with adverse reactions in patients using the biomedical device. Therefore, it is desirable, if not necessary, to extract these extractable materials from the polymerized biomedical devices during the manufacture thereof to reduce or prevent adverse reactions in patients. For example, in the production of ophthalmic lenses, such as contact lenses, the polymerized lenses are contacted by liquid extraction media which may include aqueous compositions, such as water, saline, buffered solutions and the like, or organic solvent compositions, such as alcohol containing compositions. The extraction procedures may be performed in an extraction station prior to packaging the ophthalmic lenses, or may be performed in the ophthalmic lens packages prior to sealing the package. In the commercial manufacture of polymerized biomedical devices, including ophthalmic lenses, such as hydrogel and silicone hydrogel contact lenses, it is desirable to continue to develop new manufacturing components, systems, methods, and the like to reduce production time, to reduce production costs, and to increase productivity, among other things.

SUMMARY

Devices and assemblies used in extraction procedures to remove an extractable component from polymerized biomedical devices are described herein. The devices herein, for purposes of convenience, may be referred to as extraction trays. The devices are also referred to as polymerized biomedical device carriers. The present polymerized biomedical device carriers include a plurality of recesses or cavities structured, such as sized and shaped, to hold, retain, or accommodate a polymerized biomedical device during an extraction procedure. The present assemblies comprise a plurality of polymerized biomedical device carriers. For example, an assembly described herein comprises a first biomedical device carrier, a second biomedical device carrier in contact with the first biomedical device carrier, and a third biomedical device carrier in contact with the second biomedical device carrier. Methods of extracting polymerized biomedical devices include using the present devices and assemblies.

With the present devices, assemblies, and methods, it is possible to extract or remove an extractable component, which can include one or more extractable materials, from a large number of polymerized biomedical devices with less extraction media compared to existing extraction processes of which the inventors are aware. It is possible to process a large number of polymerized biomedical devices in a specified amount of time with relatively small amounts of extraction media, thereby resulting in increased efficiency and reduced costs associated with the manufacture of the polymerized biomedical devices.

DETAILED DESCRIPTION

Figure 1:
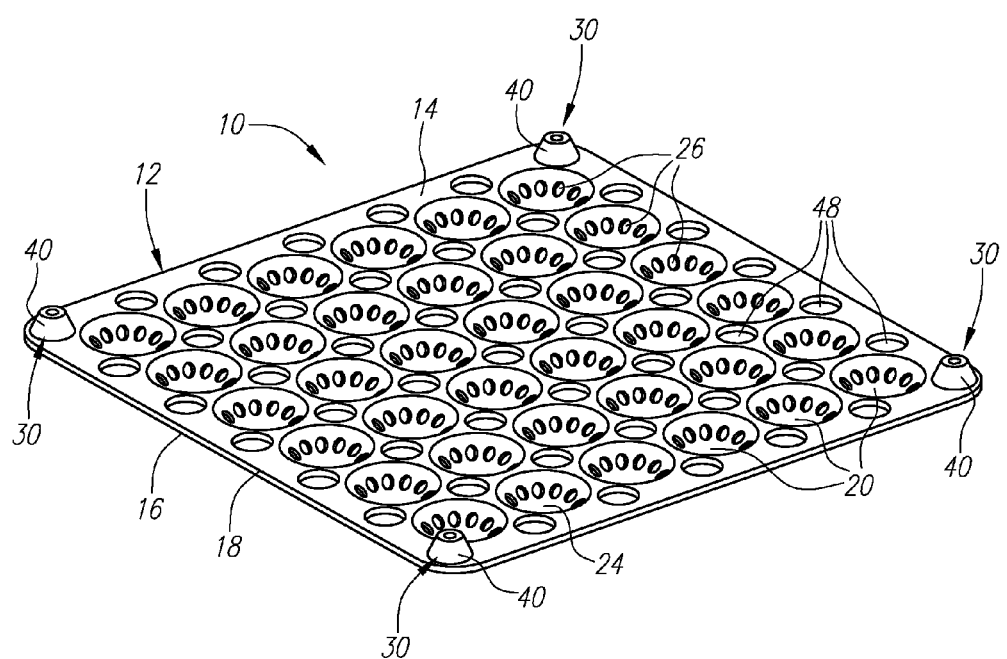
FIG. 1 is a perspective view of a single polymerized biomedical device carrier comprising a plurality of recesses to accommodate a plurality of polymerized biomedical devices.

Biomedical device carriers are described. The present carriers are used to hold, accommodate, or retain a plurality of polymerized biomedical devices during an extraction procedure. As used herein, an extraction procedure refers to a procedure in which an extractable component of a polymerized biomedical device or polymerized biomedical devices is removed from the device or devices to produce an extracted polymerized biomedical device or devices. The extractable component can be understood to include unreacted monomers, oligomers, partially reacted monomers, or other agents which have not become covalently attached or otherwise immobilized relative to the device-forming component. The extractable component can also be understood to include one or more additives, including organic additives, including diluents, that can be extracted from the polymerized lens product during an extraction procedure. Thus, materials of the extractable component can include linear uncross-linked, cross-linked, or branched polymers of extractable materials that are not cross-linked to or otherwise immobilized relative to the polymer backbone, network, or matrix of the biomedical device.

The present biomedical device carriers are structured, such as sized and shaped, to be closely arranged together to facilitate effective extraction of the polymerized biomedical devices using reduced amounts of extraction media compared to existing extraction procedures. Thus, with the present carriers, large numbers of biomedical devices can be extracted in a given amount of time and with relatively small amounts of extraction media.

In one aspect, a biomedical device carrier is provided and the carrier comprises, consists essentially of, or consists of, a substantially planar substrate, a plurality of recesses, and at least one carrier spacing member that is structured to maintain a desired distance between two carriers when in contact with each other.

In more detail, the substrate has a first substrate surface and a second substrate surface opposing the first substrate surface. The distance between the first substrate surface and the opposing second substrate surface defines a substrate thickness. The plurality, that is two or more, of recesses of the carrier extend from the first substrate surface and beyond the second substrate surface. Each recess has a depth greater than the substrate thickness. Each recess is structured, such as sized and shaped, to accommodate, hold, or retain, a polymerized biomedical device during an extraction procedure. With respect to a single biomedical device carrier, one or more carrier spacing members are provided as a component of the carrier, and the carrier spacing member is, or the carrier spacing members are, structured, such as sized and shaped, to provide an inter-carrier distance from about 0.12 inches to about 0.50 inches when the carrier is in contact with a second substantially identical carrier, such that the second substrate surface of the carrier is facing the first substrate surface of the second carrier (for example, when the carrier is placed on top of the second carrier). The same inter-carrier distance can be provided when the second carrier is placed on top of the first carrier such that the second substrate surface of the second carrier is facing the first substrate surface of the first carrier. In certain embodiments of the present carriers, the inter-carrier distance is no less than 0.12 inches and is no greater than 0.50 inches. It can be understood that the at least one carrier spacing member is effective in maintaining the distance between a second substrate surface of a first carrier and a first substrate surface of a second substantially identical carrier when the two carriers are in contact with each other and the first carrier is located on top of the second carrier at a value from about 0.12 inches to about 0.50 inches.

As used herein, the phrase "substantially identical" refers to a structure or a component of a device that is essentially identical except for variations that may be introduced in a manufacturing process of the structure or component. Ideally, the carriers are identically structured, that is sized and shaped, to each other, but due to manufacturing variability tolerances, persons of ordinary skill in the art will understand that some variation may be present and the carriers will still be substantially identical.

As used herein, the phrase "inter-carrier distance" refers to the perpendicular distance between two adjacent carriers in contact with each other, such as in direct physical contact with each other such that a portion of one carrier is touching a portion of a second carrier. The inter-carrier distance can be measured between a bottom surface of a recess of a first carrier and a top surface of a recess of a second carrier located beneath the first carrier, or the inter-carrier distance can be measured between the second substrate surface of a first carrier and the first substrate surface of a second carrier located beneath the first carrier.

In another aspect, a biomedical device extraction assembly is provided and described. The present biomedical extraction assemblies comprise a plurality of biomedical device carriers, each carrier having a plurality of recesses structured to hold, accommodate, or retain a plurality of polymerized biomedical devices. The assembly may comprise a frame in which the plurality of carriers can be contained and transported. The assembly may comprise a tank for containing the plurality of carriers and an extraction medium for removing an extractable component from the polymerized biomedical devices. Or, the assembly may comprise a frame and a tank, wherein the frame containing the plurality of carriers can be placed in the tank. In addition, a plurality of assemblies can be provided, such as during the manufacture of the biomedical devices. For example, it may be desirable to have a continuous process for extracting the polymerized biomedical devices, where two, four, six, eight, or ten biomedical device extraction assemblies are being used during an extraction procedure to process large quantities of the polymerized biomedical devices in a given amount of time.

In one embodiment, a biomedical device extraction assembly comprises two or more biomedical device carriers in contact with each other and having an inter-carrier distance from about 0.12 inches to about 0.50 inches. Preferably, the inter-carrier distance between every two adjacent carriers is greater than about 0.12 inches and is less than about 0.50 inches. By structuring the carriers to have an inter-carrier distance within this range, it is possible to achieve sufficient extraction of the extractable component from a large quantity of biomedical devices with a relatively small quantity of extraction media per biomedical device.

In another embodiment, a biomedical extraction assembly comprises at least three biomedical device carriers. For example, a biomedical device extraction assembly comprises a first biomedical device carrier, a second biomedical device carrier that is substantially identical to the first biomedical device carrier, and a third biomedical device carrier that is substantially identical to the first biomedical device carrier (and accordingly, substantially identical to the second biomedical device carrier). The first biomedical device carrier comprises a plurality of recesses including a concave surface. Each recess is structured to accommodate a single polymerized biomedical device during an extraction procedure to remove an extractable component from the polymerized biomedical device. The second biomedical device carrier is in contact with the first biomedical device carrier so that a convex surface opposing the concave surface of the recess of the second biomedical device carrier extends into the recess of the first biomedical device carrier to form a cavity to accommodate the polymerized biomedical device. The third biomedical device carrier is in contact with the second biomedical device carrier so that a convex surface opposing the concave surface of the recess of the third biomedical device carrier extends into the recess of the second biomedical device carrier to form a cavity to accommodate a polymerized biomedical device.

In yet another aspect, methods for producing polymerized biomedical devices are provided and described. The methods include a step of extracting an extractable component from polymerized biomedical devices. The present methods include using the present biomedical device carriers, assemblies, or both, in an extraction procedure to remove an extractable component from the biomedical devices.

In one embodiment, a method of extracting an extractable component from polymerized biomedical devices comprises providing a plurality of polymerized biomedical devices in a plurality of recesses of at least one carrier of a biomedical device extraction assembly. The assembly may comprise two or more biomedical device carriers having an inter-carrier distance from about 0.12 inches to about 0.50 inches, as described herein. Or, the assembly may comprise three or more biomedical device carriers, wherein a first biomedical device carrier is in contact with a second biomedical device carrier, and the second biomedical device carrier is in contact with the third biomedical device carrier, as described herein. The method also comprises contacting the plurality of polymerized biomedical devices with a liquid extraction composition to remove an extractable component from the polymerized biomedical devices to produce a plurality of extracted polymerized biomedical devices.

In certain embodiments of the methods, the contacting step comprises directing the liquid extraction composition laterally across the polymerized biomedical devices. Or, another embodiment of the present methods may comprise a contacting step that comprises directing the liquid extraction composition through a single inlet port and outlet port of a storage tank containing an extraction assembly.

Additional embodiments of the methods may comprise contacting the plurality of extracted polymerized biomedical devices with an aqueous composition to hydrate the extracted polymerized biomedical devices.

An embodiment of a single biomedical device carrier is illustrated in FIG. 1. The biomedical device carrier 10 comprises a substantially planar substrate 12. The substrate 12 has a first substrate surface 14 and a second opposing substrate surface 16 (see FIG. 2). The substrate thickness 18 is illustrated as the distance between first substrate surface 14 and second substrate surface 16. In this embodiment, the carrier is free of a depending sidewall extending below the second substrate surface 16 or above the first substrate surface 14. The substrate thickness is typically from about 0.007 inches to about 0.100 inches. In certain embodiments, the substrate thickness is from about 0.040 inches to about 0.100 inches. For example, some carriers may comprise a substrate having a substrate thickness from about 0.050 inches to about 0.060 inches. As another example, a carrier may comprise a substrate having a substrate thickness of 0.057 inches.

The substrate thickness is selected, at least in part, by the desired packing density of the carriers and the materials from which the carriers are made. For example, when metals are used to produce the carriers, the substrate thickness can be thinner than when more flexible materials, such as plastics, are used. Certain embodiments of the present biomedical device carriers comprise a plastic material, a metal material, or both. Thus, a carrier may comprise a material selected from the group consisting of plastics and metals. In certain embodiments, the material comprises a polyolefin material, such as polypropylene. In other embodiments, the material comprises steel, alloy, or other metal that is unreactive in extraction media, such as organic solvents and the like.

The carrier 10 comprises a plurality of recesses 20 (of which only three of the illustrated recesses are numbered). The recesses may also be understood to be cavities. The depth 22 of one recess 20 is more clearly illustrated in FIG. 5. The recess depth 22 is determined by measuring the perpendicular distance from the first substrate surface 14 adjacent to the recess 20 to the lowest point of the inner surface of the recess 20. The recess 20 has a volume to accommodate the polymerized biomedical device as it expands from it's pre-extracted size to an expanded size when in contact with an extraction medium, as discussed herein.

In certain embodiments, the plurality of recesses 20 are integrally formed with the substantially planar substrate 12 as an injection mold plastic member or as a thermoformed plastic member. In other embodiments, the recesses 20 are integrally formed with the substantially planar substrate 12 as a stamped metal member.

As shown in the drawings, each of the recesses 20 of the carrier 10 may comprise a concave surface 24 having a plurality of openings 26 extending from the concave surface 24 to an opposing convex surface 28. Providing openings 26 in the recess surface facilitates delivery of the extraction composition into and out from the recess where the polymerized biomedical device is contained. In certain embodiments, each recess 20 has a diameter of about 1 inch and a depth of about 0.375 inches.

The present carriers 10 also comprise at least one carrier spacing member 30. In the embodiment illustrated in FIG. 1, the carrier 10 comprises a plurality of carrier spacing members 30. For example, a plurality of spacing members 30 are provided near the second substrate surface 16 (see FIG. 5) and a plurality of spacing members 30 are provided extending from the first substrate surface 14 (see FIG. 1, and FIGS. 4-6). The carrier spacing member or members are structured, that is sized and shaped, to provide the desired inter-carrier distance described herein. In certain embodiments, the at least one carrier spacing member is structured to provide an inter-carrier distance from about 0.15 inches to about 0.25 inches. For example, in one embodiment, the inter-carrier distance provided by the carrier spacing members is 0.18 inches.

Figure 3:
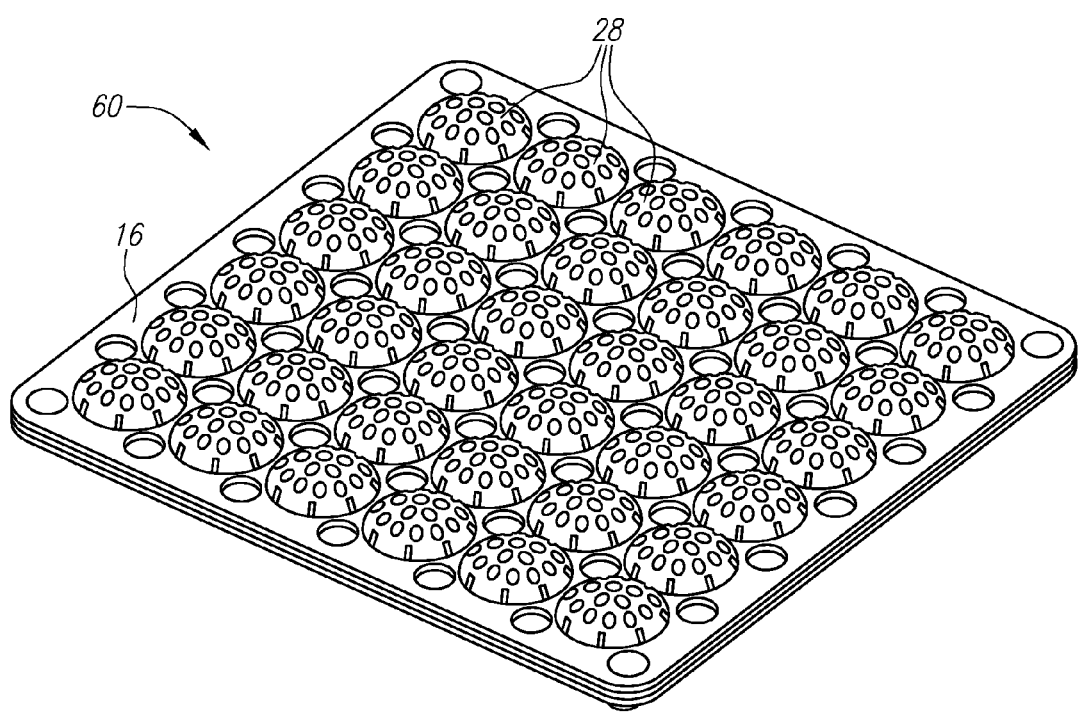
FIG. 3 is a bottom perspective view of the assembly of FIG. 2.
Figure 4:
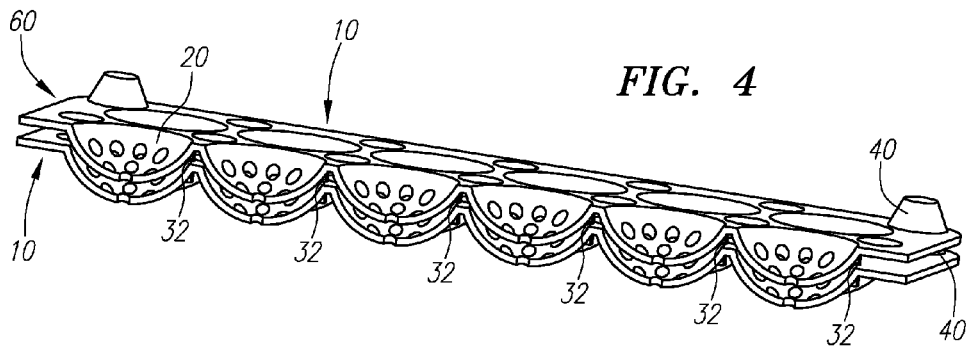
FIG. 4 is a sectional view of the assembly of FIG. 2.
Figure 5:
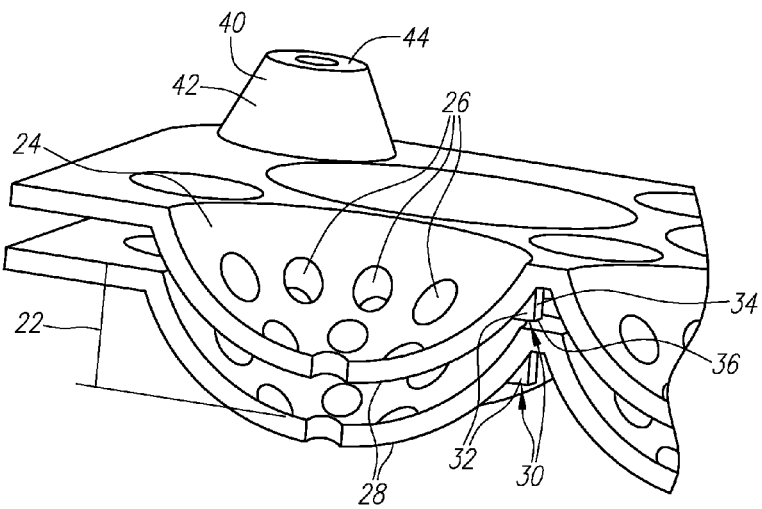
FIG. 5 is a magnified view of a portion of FIG. 4.

As shown in FIG. 3, the substrate 12 of the carrier 10 comprises a plurality of convex surfaces 28 extending from the second substrate surface 16. Each convex surface 28 opposes the concave surface 24 of a single recess 20. Each of the carrier spacing members 30 extend from the convex surface 28. In reference to the drawings, these spacing members 30 which extend from the convex surface 28 can be understood to be flanges 32. The flanges 32 can be understood to be protrusions extending from the convex surface, such as ribs, collars, rims, or edges that position one carrier relative to another carrier. As shown in FIG. 5, the flange 32 of the upper carrier 10 extends from the convex recess surface 28 and contacts the first substrate surface 14 of the bottom carrier 10. Although the illustrated carrier comprises a plurality of flanges 32 extending from each convex surface 28, other embodiments may comprise a single flange, such as an annular rib extending around the convex surface 28. Each flange 32 has a first edge surface 34 oriented at a substantially 90 degree angle relative to the second substrate surface 16, and a second edge surface 36 that is substantially parallel to the second substrate surface 16.

Figure 6:
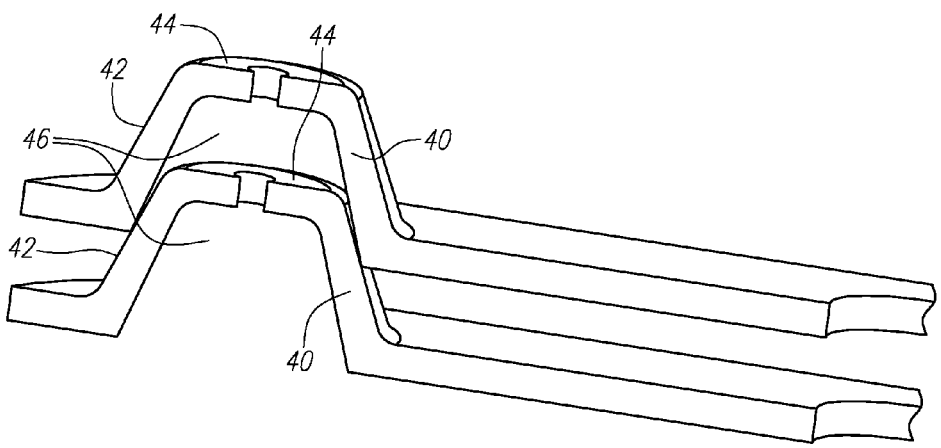
FIG. 6 is a magnified view of another portion of FIG. 4.

In addition, or alternatively, the carrier 10 may comprise at least one carrier spacing member 30 that is a post extending from the first substrate surface 14, such as the plurality of posts 40 illustrated in FIGS. 1 and 6. The carrier 10 illustrated in FIG. 1 comprises a plurality (two or more) posts 40 positioned around the perimeter of the substrate member 12. In particular, four posts 40 are provided, one near each corner of the substrate member 12. In other embodiments, more or less posts may be provided. For example, in one embodiment, a perimeter ridge may be provided around the recesses to provide the desired inter-carrier spacing distances.

Referring to the illustrated embodiment shown in FIG. 6, each post 40 has a conical sidewall surface 42 and a substantially planar top surface 44. The illustrated post 40 also includes a cavity 46 extending from the second substrate surface 16 toward the substantially planar top surface 44. The post cavity 46 is dimensioned to accommodate a post 40 of a second carrier 10.

In reference to the illustrated embodiments, the present biomedical device carriers 10 comprise a plurality of carrier spacing members 30, wherein the carrier spacing members 30 are selected from the group consisting of projections or flanges 32 extending from the convex surfaces 28 extending from the second substrate surface 16, posts 40 extending from the first substrate surface 14, and combinations thereof.

In certain embodiments, including the illustrated embodiment of FIG. 1, the carrier 10 also comprises a plurality of openings 48 (three of which are identified with numbers) located around the perimeter of each recess 20. It can be appreciated that by providing numerous openings in the carrier, whether between the recesses 20 or in the recesses 20 or both, increased fluid flow can be achieved especially when a plurality of the carriers are arranged in an extraction assembly.

Figure 12:
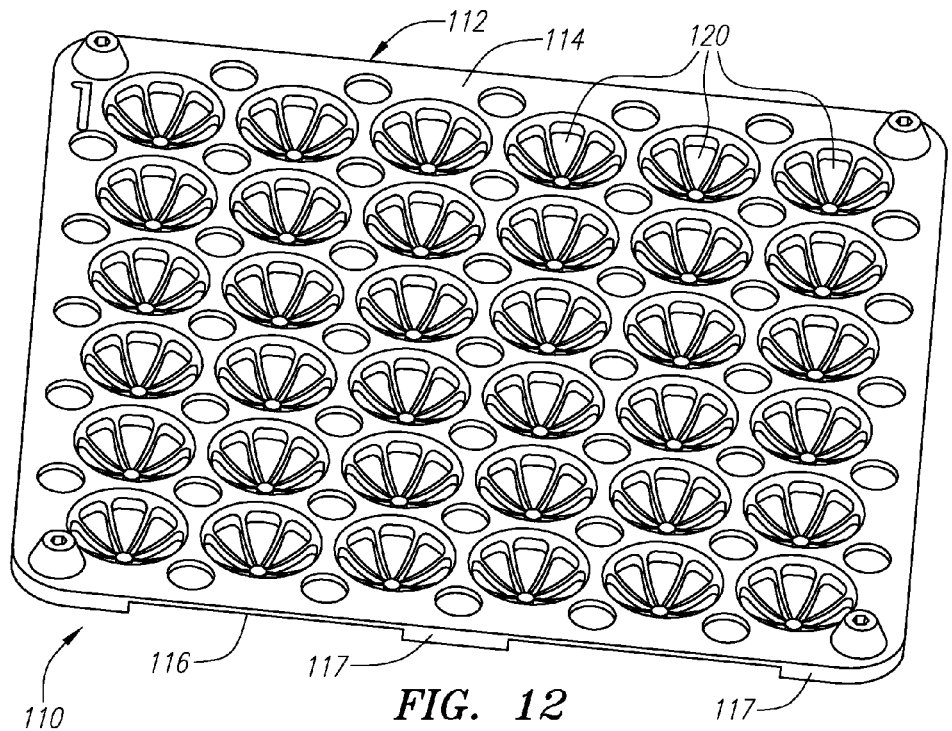
FIG. 12 is a top perspective view of another single polymerized biomedical device carrier comprising a plurality of recesses to accommodate a plurality of polymerized biomedical devices.
Figure 13:
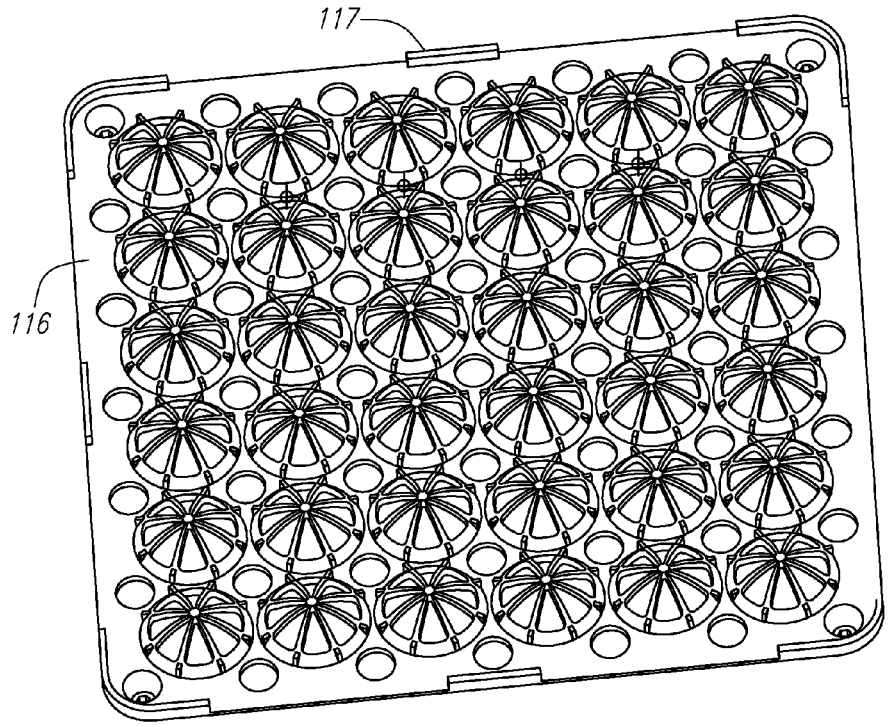
FIG. 13 is a bottom perspective view of the carrier of FIG. 12.
Figure 14:
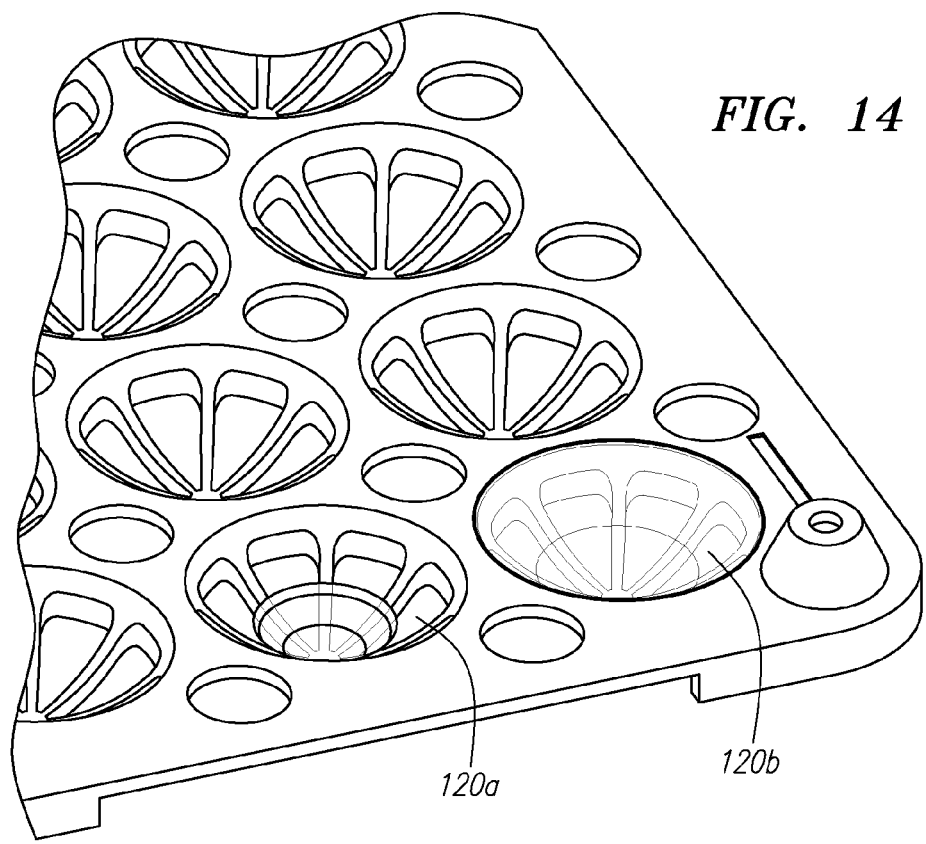
FIG. 14 is a magnified view of a portion of the carrier of FIG. 12 including a pre-extracted silicone hydrogel contact lens (left lens) and an extracted and expanded silicone hydrogel contact lens (right lens), each lens in a recess of the carrier.

Another biomedical device extraction carrier 110 is illustrated in FIGS. 12-13. The biomedical device carrier 110 comprises a substantially planar substrate 112. The substrate 112 has a first substrate surface 114 and a second opposing substrate surface 116. The substrate thickness 118 is illustrated as the distance between first substrate surface 114 and second substrate surface 116. In this embodiment, the carrier includes depending sidewalls 117 extending below the second substrate surface 116. The carrier 110 comprises a plurality of recesses 120 (of which only three of the illustrated recesses are numbered). The recess 120 has a volume to accommodate the polymerized biomedical device as it expands from it's pre-extracted size to an expanded size when in contact with an extraction medium, as discussed herein. For example, FIG. 14 shows a pre-extracted silicone hydrogel contact lens located in the left recess 120a and an expanded silicone hydrogel contact lens which has been expanded by contacting the contact lens with an extraction composition, such as alcohol, in the right recess 120b. It will be understood that the two contact lenses are illustrated for purposes of convenience. In a typical manufacturing process, all of the contact lenses in a single carrier will be undergoing similar physical changes at the same time, since the carrier containing the contact lenses is placed in the extraction medium.

Figure 2:
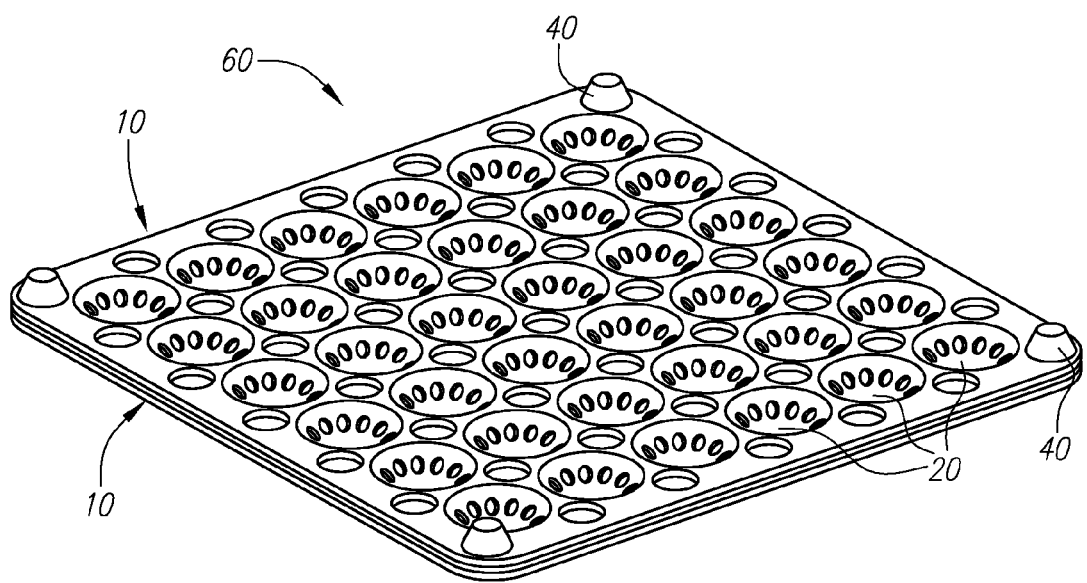
FIG. 2 is a top perspective view of an assembly of two of the carriers of FIG. 1 in contact with each other.
Figure 15:
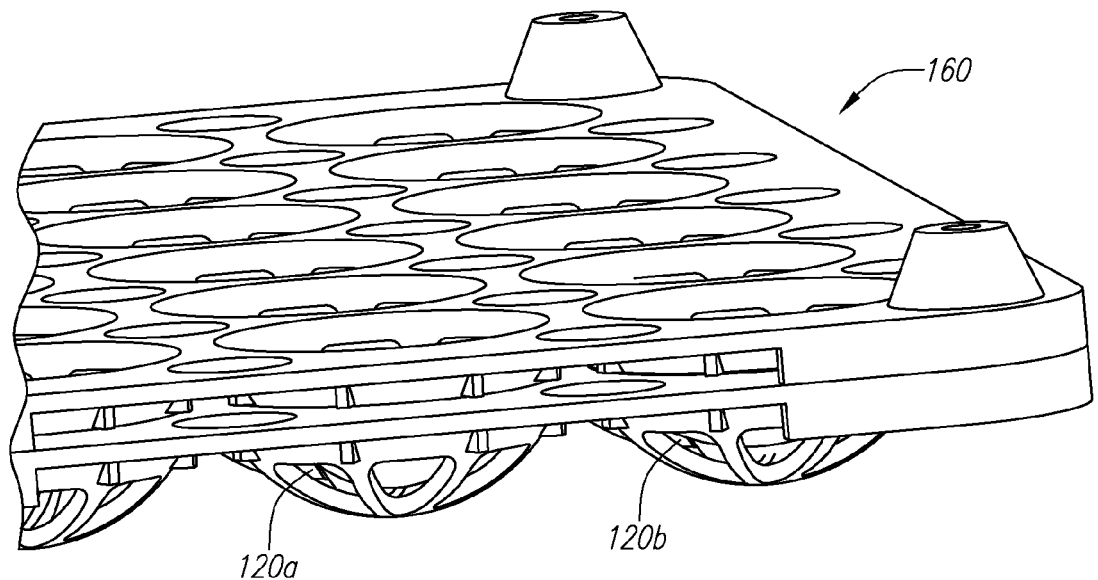
FIG. 15 is a magnified view of an assembly of two of the carriers of FIG. 12.

As shown in FIG. 2, a biomedical device extraction assembly 60 comprises a plurality of biomedical device carriers, as described herein. For example, in FIGS. 2-6, an assembly of two biomedical device carriers are illustrated. In this embodiment, the inter-carrier distance between the first and second carrier is from about 0.12 inches to about 0.50 inches, as described herein. Another extraction assembly 160 of two carriers 110 is illustrated in FIG. 15.

Figure 7:
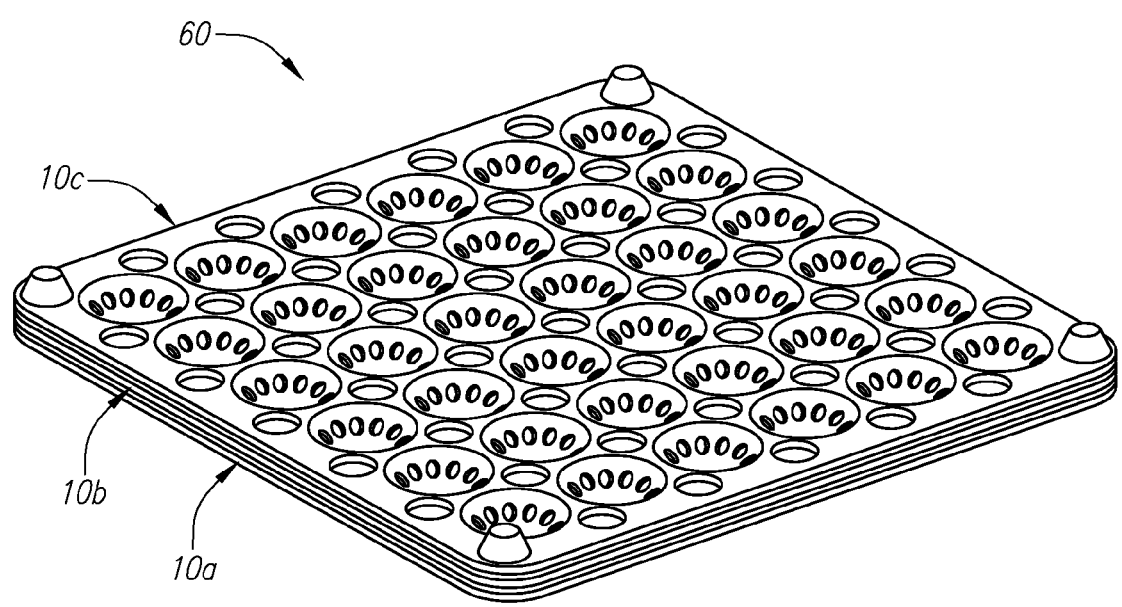
FIG. 7 is a perspective view of an assembly of three of the carriers of FIG. 1.

FIG. 7 illustrates a biomedical device extraction assembly 60 that comprises three biomedical device carriers 10. For example, the assembly 60 comprises a first biomedical device carrier 10a, a second biomedical device carrier 10b, and a third biomedical device carrier 10c. In other embodiments, at least one additional substantially identical biomedical device carrier is provided in contact with either the first biomedical device carrier 10a or the third biomedical device carrier 10c.

Figure 8:
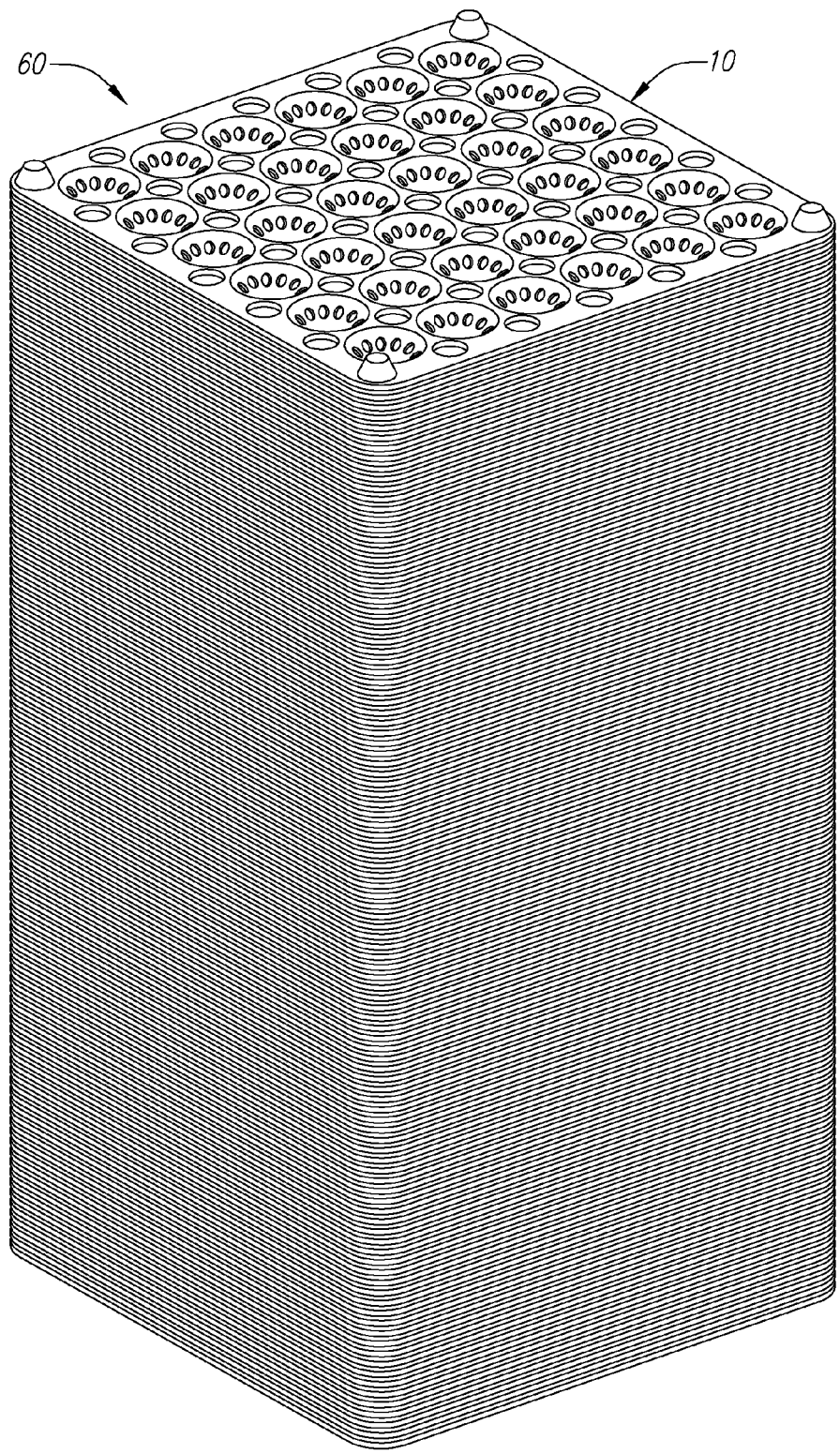
FIG. 8 is a perspective view of an assembly of about one hundred of the carriers of FIG. 1.
Figure 9:
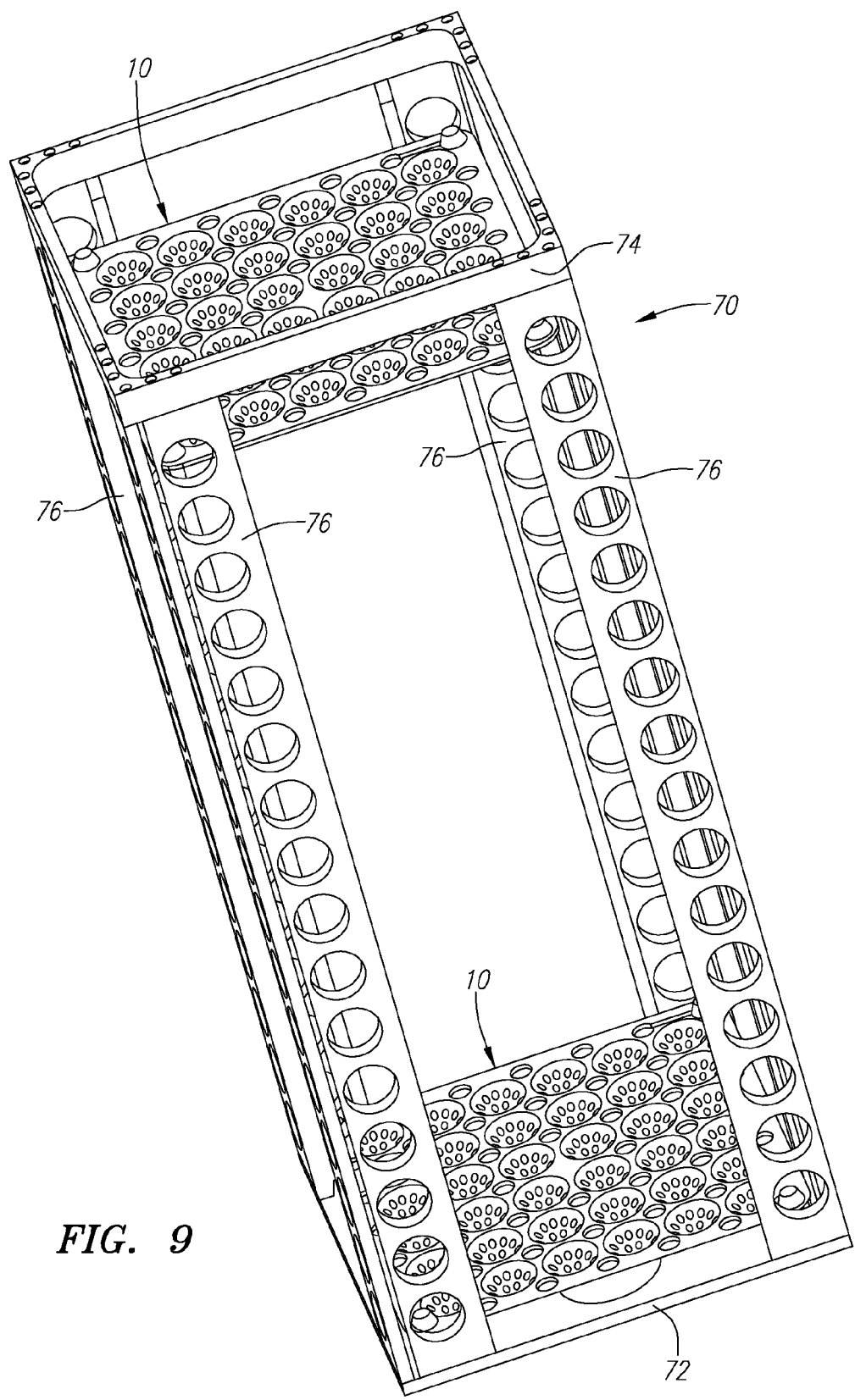
FIG. 9 is a perspective view of an assembly frame for holding a plurality of the present biomedical device carriers.

As shown in FIG. 8, the assembly can comprise substantially more than three biomedical device carriers arranged in a stack. For example, the assembly may comprise from about 50 biomedical device carriers to about 150 biomedical device carriers.

Unlike existing extraction assemblies, which consist of a first carrier having recesses for holding a biomedical device and a second carrier placed on top of the first carrier to form a cavity for holding the biomedical device therebetween and to define a carrier pair which is spaced apart from another substantially identical carrier pair, the present assemblies comprise three or more carriers in an uninterrupted stack of carriers. In other words, there is no void in the assembly where at least a portion of one carrier is not in contact with a portion of a second carrier.

In certain embodiments, including the embodiments illustrated in FIG. 7, the inter-carrier distance between the first and second carrier or the second and third carrier is from about 0.12 inches to about 0.50 inches. In further embodiments, the inter-carrier distance is from about 0.15 inches to about 0.25 inches. In addition, in certain embodiments, the inter-carrier distance between the first substrate surface of the first carrier and the second substrate surface of the second carrier is equal to the inter-carrier distance between the concave recess surface of the first carrier and the convex recess surface of the second carrier. For example, in at least one embodiment, the inter-carrier distance is about 0.18 inches both within the recess and between the substrate surfaces.

With the present carriers, an assembly is provided wherein the carriers are arranged or stacked relative to each other to provide sufficient extraction with less than 10 mL of a liquid extraction composition per polymerized biomedical device. For example, it is possible to achieve sufficient extraction with about 7 mL of the liquid extraction composition per polymerized biomedical device.

With the present carriers, an assembly is also provided wherein the carriers are structured and arranged relative to each other to provide sufficient extraction of about 4000-5000 polymerized biomedical devices in about 28 liters of a liquid extraction composition.

Figure 10:
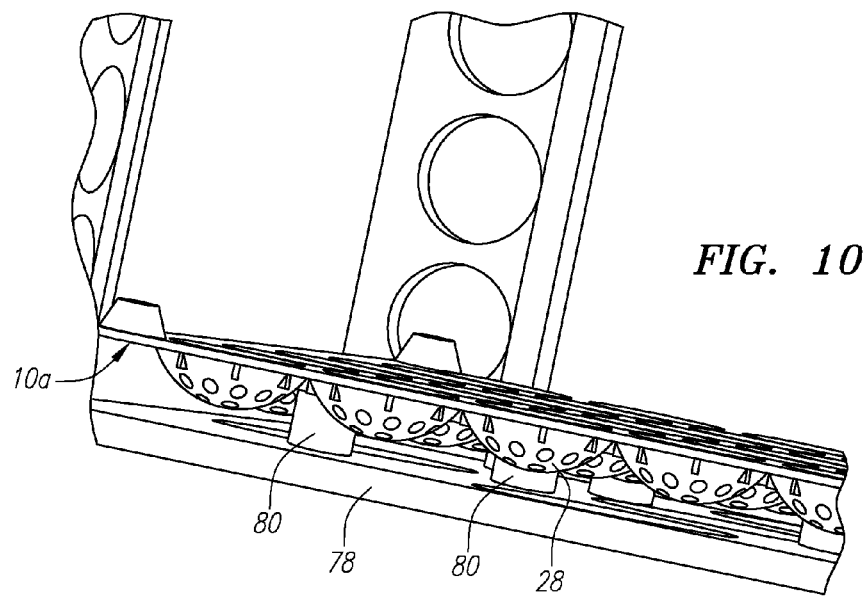
FIG. 10 is a magnified view of a first end of the assembly frame of FIG. 9.
Figure 11:
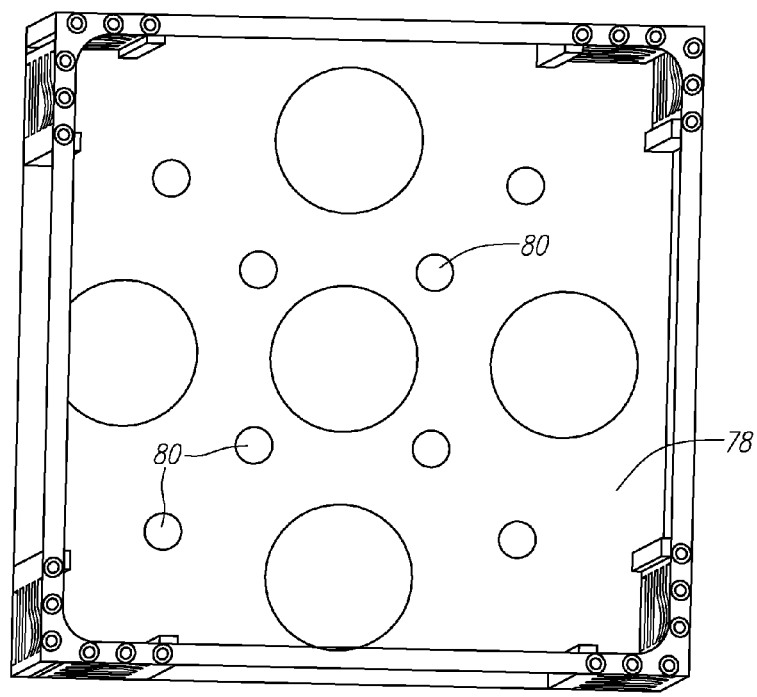
FIG. 11 is a top plan view of the first end of the assembly frame of FIG. 10.

The present assemblies may further comprise a frame 70, as shown in FIG. 8. The frame 70 is structured so that all of the biomedical device carriers 10 can be located in the frame 70. The frame 70 includes a first end 72, a second end 74, and a plurality of struts 76 connected to the first end 72 and the opposing second end 74. Each of the carriers 10 (two of which are illustrated) are retained in the frame 70 by the plurality of struts 76. In the illustrated embodiment of frame 70, the frame comprises a plate 78 located at the first end 72 of the frame. The plate 78 includes at least one carrier spacing member 80 extending from the plate 78 toward the second end 74 to prevent contact between a convex cavity surface 28 of the first carrier 10a and the plate 78, as shown in FIGS. 10 and 11.

Figure 16:
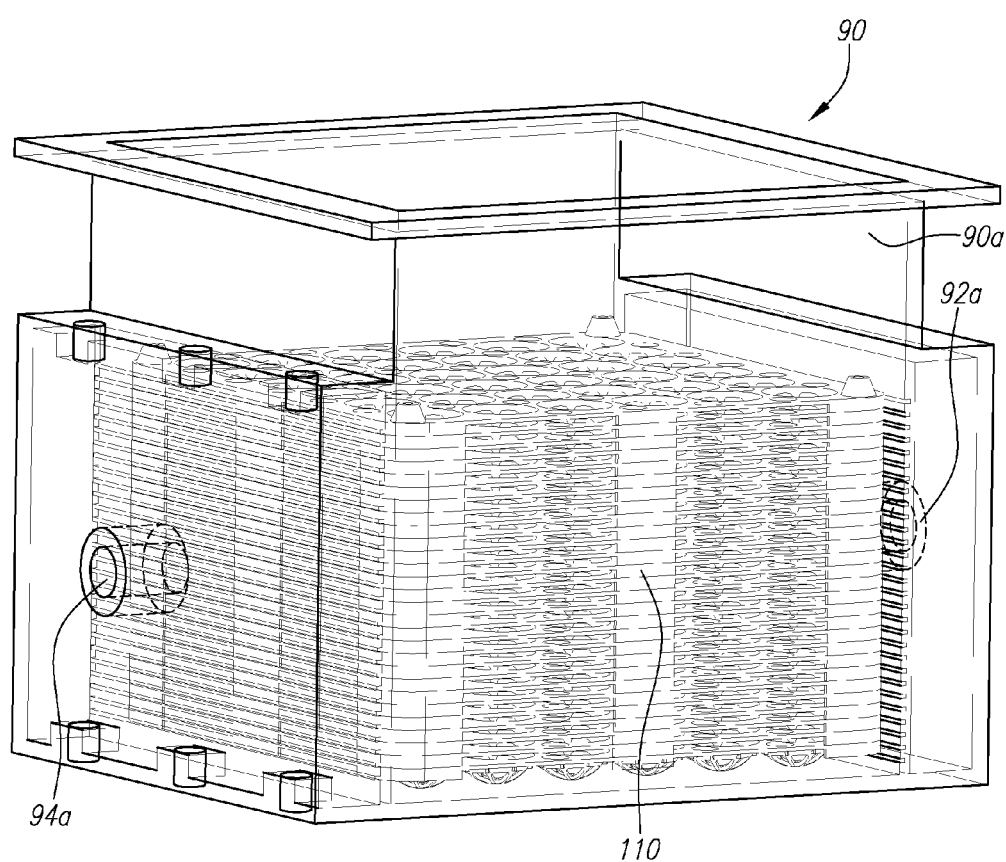
FIG. 16 is an illustration of a tank including a plurality of biomedical device carriers and a liquid extraction composition inflow port and a liquid extraction composition outflow port.

The present assemblies may also comprise a storage tank 90 in which the carriers 10 can be located during the extraction procedure. The storage tank 90 may be a vessel with a cavity to hold a liquid extraction composition, such as organic solvents, including alcohols such as ethanol, methanol, propanol and the like, or aqueous extraction solutions, in which a plurality of carriers 10 or 110, with or without a frame 70, can be placed in the composition. In some embodiments, fluid inflow and outflow ports may be provided. For example, as shown in FIG. 16, a storage tank 90a comprises a fluid inflow port 92 to direct a liquid extraction composition into the tank 90a, and a separate liquid outflow port 94 to direct the liquid extraction composition out from the tank 90a. It can be appreciated that in the embodiment of FIG. 16, the liquid inflow port 92 and the liquid outflow port 94 are laterally disposed relative to the carriers 10 or 110 and are on opposing sides of the tank 90a. With such a configuration, it is possible to generate lateral fluid flow within the tank and obtain sufficient extraction of the biomedical devices.

Figure 17:
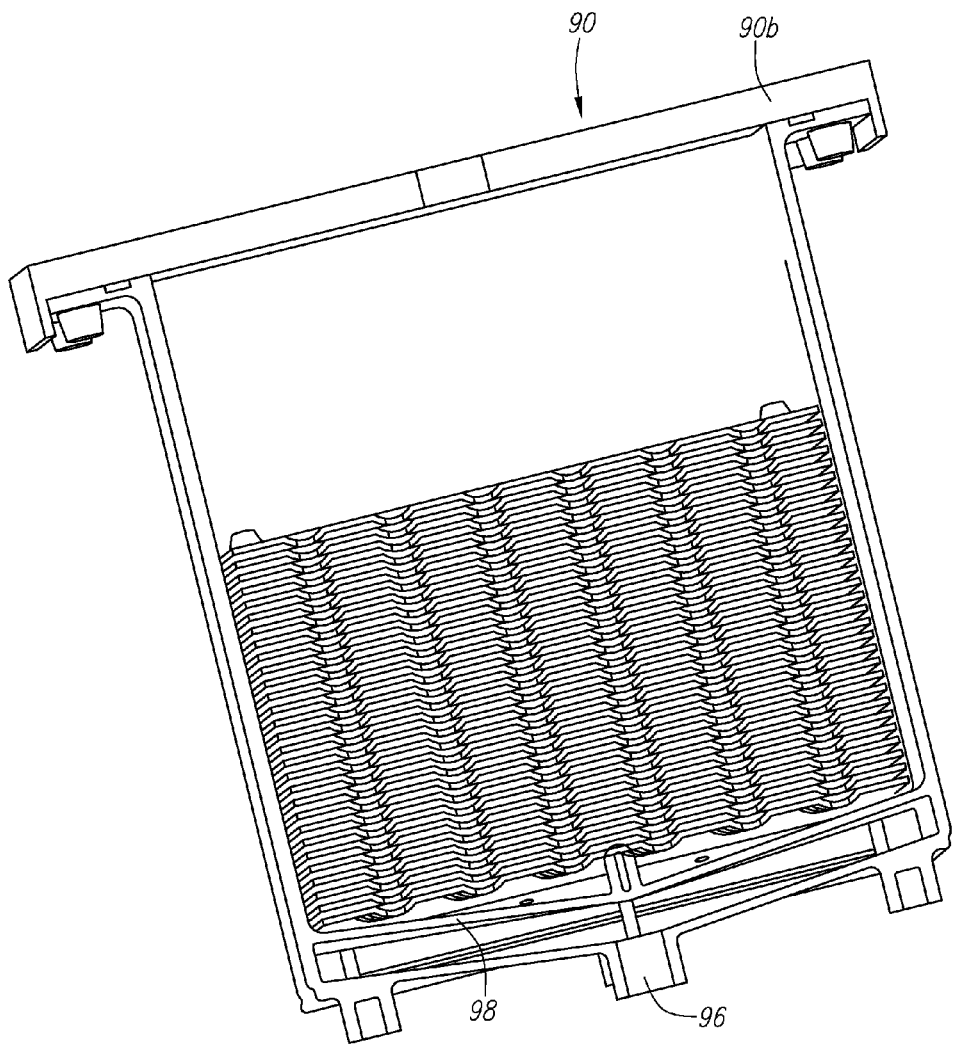
FIG. 17 is a sectional view of an assembly tank including a plurality of biomedical device carriers and a single liquid extraction composition inflow/outflow port.
Figure 18:
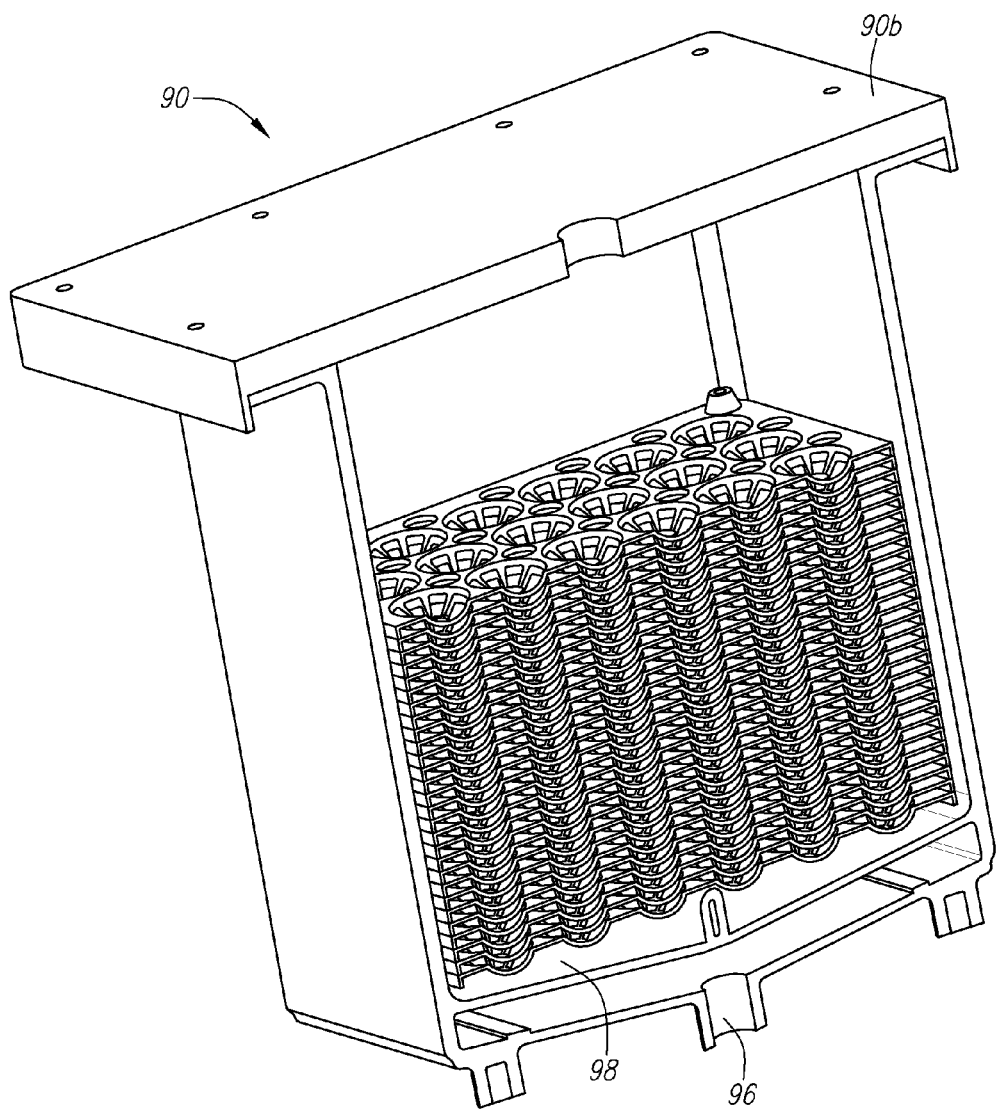
FIG. 18 is a rotated view of the tank of FIG. 17.
Figure 19:
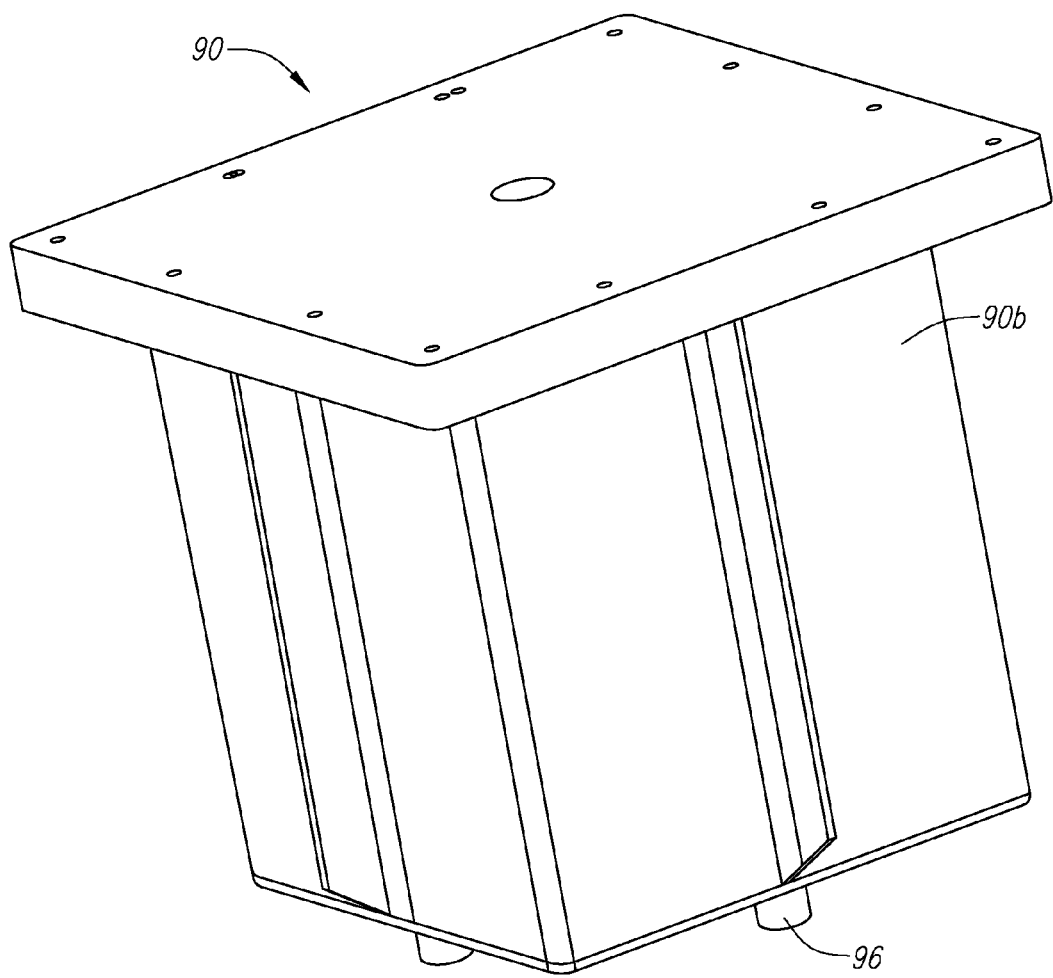
FIG. 19 is a perspective view of the assembly tank of FIG. 17.

FIG. 17 shows a storage tank 90b that comprises a single liquid inflow and outflow port 96. In other words, the liquid extraction composition is directed into the tank 90b by inflow port 96 and out from the tank 90b by outflow port 96. Storage tank 90b further comprises a baffle structure 98 which can be understood to be a plate with a plurality of holes to allow liquid to flow from the inlet port into the space where the carriers are located. The baffle structure 98 helps reduce the pressure or force in which the extraction composition enters the tank to reduce the potential impact on the polymerized biomedical devices.

Although the present devices, assemblies, and methods can be used effectively in the manufacture, and particularly the extraction of polymerized biomedical devices having an extractable component, the present devices, assemblies, and methods, are particularly useful in the extraction of polymerized ophthalmic lenses, such as contact lenses. The contact lenses can be hydrogel contact lenses, such as soft contact lenses that are free of a silicone component, or the contact lenses can be silicone hydrogel contact lenses, such as soft contact lenses that include a silicone component. The present devices, assemblies, and methods, are particularly useful in the production of silicone hydrogel contact lenses where it is necessary to remove the extractable component of the contact lens prior to packaging. Examples of hydrogel contact lens materials and silicone hydrogel contact lens materials are well known in the art. For example, examples of silicone hydrogel contact lens materials include materials having the following United States Adopted Names (USANs): balafilcon A (PUREVISION, Bausch & Lomb), lotrafilcon A (NIGHT & DAY, CIBA Vision), lotrafilcon B (O2OPTIX, CIBA Vision), galyfilcon A (ACUVUE ADVANCE, Vistakon), senofilcon A (ACUVUE OASYS, Vistakon), comfilcon A (BIOFINITY, CooperVision), and enfilcon A (CooperVision).

Thus, the present carriers may comprise a plurality of recesses, wherein each recess is dimensioned to accommodate a polymerized silicone hydrogel contact lens. In addition, the present assemblies may further comprise only one polymerized biomedical device, such as a silicone hydrogel contact lens, in each recess of the carriers of the assembly.

The present biomedical device carriers can be made by any conventional technique known to persons of ordinary skill in the art. For example, a biomedical device carrier can be injection molded or thermoformed from a plastic material, such as a polyolefin resin, like polypropylene. Or, the carrier can be machined or formed from a metal material, such as by heat stamping the metal.

The assemblies can be made by placing a carrier in contact with another carrier to form a stack of carriers. Any suitable number of carriers can be stacked depending on the specifications of the extraction system, the biomedical device, and the volume of extraction media.

During the manufacture of the biomedical devices, the carriers are used by placing a plurality of biomedical devices in the recesses of the carriers. A carrier without the biomedical devices can then be placed on the carrier with the biomedical devices, and additional biomedical devices can be placed in the recesses of the second carrier. This process can continue until the assembly of carriers and biomedical devices is at the desired amount. The stack of carriers can then be placed in a frame, which can provide support to the stack of carriers during transport, and the frame and carriers can be placed in a storage tank. Alternatively, the stack of carriers can be placed directly in the storage tank. The storage tank may contain a volume of an extraction composition prior to placement of the carriers therein, or the composition can be delivered into the tank after placement of the carriers in the tank.

After one extraction cycle, the carriers can be moved to another storage tank with another volume of extraction composition, or the first storage tank can be emptied and refilled with an extraction composition. After the extraction process, the biomedical devices can be hydrated by placing the carriers and devices in a storage tank, with or without a frame, containing an aqueous solutions, such as deionized water, saline, and the like, or the storage tank can be emptied and refilled with an aqueous solution to produce hydrated biomedical devices.

As one example, polypropylene resin pellets are injection molded using an injection molding machine to form a biomedical device carrier having a length of about 8 inches, a width of about 8 inches, and a carrier height of about 0.625 inches. The carrier height, as used herein, is the maximum height of the carrier (i.e., from the bottom of the convex surface of a recess to the top of the post extending from the first surface, as shown in the embodiment of FIG. 1). The substrate thickness of the substantially planar substrate is 0.057 inches. The carrier comprises thirty-six recesses for holding silicone hydrogel contact lenses. Each recess includes a concave surface with a plurality of holes extending therethrough. The recess has a diameter of about 1 inch and a maximum depth of about 0.375 inches. The carrier comprises a plurality of flanges extending from the convex recess surface and a plurality of posts extending from first substrate surface. The flanges and posts provide an inter-carrier distance of 0.18 inches within the recesses and outside of the recesses. A plurality of holes are provided adjacent each of the recesses. A stack of 110-115 carriers is assembled by placing one carrier on top of another for form an extraction assembly. The assembly is placed inside a frame or in a storage tank or both, where the polymerized biomedical devices are contact with ethanol. In the extraction procedure, multiple ethanol washes are performed before contacting the biomedical devices with an ethanol/water combination, and subsequently multiple washes of deionized water.

Although the disclosure herein refers to certain specific embodiments, it is to be understood that these embodiments are presented by way of example and not by way of limitation. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment disclosed herein. The intent of the foregoing detailed description, although discussing exemplary embodiments, is to be construed to cover all modifications, alternatives, and equivalents of the embodiments described in the present description and claims.

What is claimed is:

1. A biomedical device carrier assembly for holding a plurality of polymerized biomedical devices during an extraction procedure, the carrier assembly comprising:

a first carrier and a second carrier, the first carrier comprising a substantially planar substrate having a first substrate surface, and a second substrate surface opposing the first substrate surface, the distance between the first substrate surface and opposing second surface defining a substrate thickness;

a plurality of recesses extending from the first substrate surface and beyond the second substrate surface, each recess having a depth greater than the substrate thickness and being structured to accommodate a polymerized biomedical device as the polymerized biomedical device expands in size during an extraction procedure of the polymerized biomedical device; and at least one carrier spacing member structured to provide an inter-carrier distance from about 0.12 inches to about 0.50 inches when the first carrier spacing member is in contact with the second carrier such that a convex surface of the first carrier opposes a concave surface of a recess of the second carrier and extends into the recess of the second carrier to form a cavity to accommodate the polymerized biomedical device;

wherein the inter-carrier distance is measured between a bottom surface of a recess of the first carrier and a top surface of a recess of the second carrier located beneath the first carrier, or is measured between the second substrate surface of the first carrier and the first substrate surface of the second carrier located beneath the first carrier.

2. The biomedical device carrier assembly of claim 1, wherein the substrate thickness is from about 0.007 inches to about 0.100 inches.

3. The biomedical device carrier assembly of claim 1 which comprises a material selected from plastics and metals.

4. The biomedical device carrier assembly of claim 1, wherein the at least one carrier spacing member is structured to provide an inter-carrier distance from about 0.15 inches to about 0.25 inches.

5. The biomedical device carrier assembly of claim 1, wherein the plurality of recesses are integrally formed with the substantially planar substrate as an injection molded plastic member or a thermoformed plastic member.

6. The biomedical device carrier assembly of claim 1, wherein the plurality of recesses are integrally formed with the substantially planar substrate as a stamped metal member.

7. The biomedical device carrier assembly of claim 1, wherein each recess comprises a concave surface comprising a plurality of openings extending through the concave surface to an opposing convex surface.

8. The biomedical device carrier assembly of claim 1, wherein a substrate comprises a plurality of convex surfaces extending from the second substrate surface, each convex surface opposing a concave surface of a single recess, and the at least one carrier spacing member extends from the convex surface.

9. The biomedical device carrier assembly of claim 8, wherein a plurality of carrier spacing members extend from each convex surface.

10. The biomedical device carrier assembly of claim 9, wherein each carrier spacing member includes a first edge surface oriented at a substantially 90 degree an relative to the second substrate surface, and a second edge surface that is substantially parallel to the second substrate surface.

11. The biomedical device carrier assembly of claim 1, wherein the at least one carrier spacing member is a post extending from the first substrate surface.

12. The biomedical device carrier assembly of claim 11, wherein the at least one carrier spacing member comprises a plurality of the posts positioned around the perimeter of the first substrate surface.

13. The biomedical device carrier assembly of claim 11, wherein the post includes a cavity extending from the second substrate surface toward the substantially planar top surface, the cavity dimensioned to accommodate a post of the second carrier.

14. The biomedical device carrier assembly of claim 1, wherein each recess is dimensioned to accommodate a polymerized silicone hydrogel contact lens.

15. A biomedical device extraction assembly for performing an extraction procedure on a plurality of polymerized biomedical devices, the assembly comprising:

a first biomedical device carrier comprising a plurality of recesses including a concave surface, and further comprising at least one carrier spacing member structured to provide an inter-carrier distance when the carrier spacing member is in contact with a second biomedical device carrier, wherein each recess is structured to accommodate a single polymerized biomedical device as the polymerized biomedical device expands in size during an extraction procedure to remove an extractable component from the polymerized biomedical device, the inter-carrier distance is measured between a bottom surface of a recess of the first carrier and a top surface of a recess of the second carrier located beneath the first carrier, or is measured between the second substrate surface of the first carrier and the first substrate surface of the second carrier located beneath the first carrier;

the second biomedical device carrier which is substantially identical to the first biomedical device carrier, the second biomedical device carrier being in contact with the carrier spacing member of the first biomedical device carrier and being arranged or stacked relative to the first biomedical device carrier so that a convex surface of the first biomedical device carrier opposes a concave surface of a recess of the second biomedical device carrier and extends into the recess of the second biomedical device carrier to form a cavity to accommodate a polymerized biomedical device; and a third biomedical device carrier that is substantially identical to the first biomedical device carrier, the third biomedical device carrier being in contact with the carrier spacing member of the second biomedical device carrier so that a convex surface of the second biomedical device carrier opposes a concave surface of a recess of the third biomedical device carrier and extends into the recess of the third biomedical device carrier to form a cavity to accommodate a polymerized biomedical device.

16. The assembly of claim 15, further comprising at least one additional substantially identical biomedical device carrier in contact with either the first biomedical device carrier or the third biomedical device carrier.

17. The assembly of claim 15, which comprises from about 50 biomedical device carriers to about 150 biomedical device carriers.

18. The assembly of claim 15, wherein an inter-carrier distance is present between the first and second carrier or the second and third carrier, and the inter-carrier distance is from about 0.12 inches to about 0.50 inches.

19. The assembly of claim 15, wherein the carriers are arranged relative to each other to provide sufficient extraction with less than 10 mL of a liquid extraction composition per polymerized biomedical device.

20. The assembly of claim 15, wherein the carriers are structured and arranged relative to each other to provide sufficient extraction of about 4000-5000 polymerized biomedical devices in about 28 liters of a liquid extraction composition.

21. The assembly of claim 15, further comprising one polymerized biomedical device in each recess.

22. The assembly of claim 21, wherein the polymerized biomedical device is an ophthalmic lens.

23. The assembly of claim 22, wherein the polymerized biomedical device is a silicone hydrogel contact lens.

24. The assembly of claim 15, further comprising a frame, all of the carriers being located in the frame.

25. The assembly of claim 24, wherein the frame comprises a first end, an opposing second end, and a plurality of struts connected to the first end and the opposing second end, each of the carriers being retained in the frame by the plurality of struts.

26. The assembly of claim 15, further comprising a storage tank, all of the carriers being located in the storage tank.

27. The assembly of claim 26, wherein the storage tank includes a liquid inflow port to direct a liquid extraction composition into the tank and a separate liquid outflow port to direct the liquid extraction composition out from the tank.

28. The assembly of claim 27, wherein the liquid inflow port and liquid outflow port are laterally disposed relative to the carriers and on opposing sides of the tank.

29. The assembly of claim 26, wherein the storage tank comprises a single liquid inflow and outflow port to direct a liquid extraction composition into the tank and out from the tank.

30. The assembly of claim 29, wherein the tank further comprises a baffle structure located between the inflow and outflow port and the first biomedical device carrier.

31. A method of extracting an extractable component from polymerized biomedical devices, comprising:
 providing a plurality of polymerized biomedical devices in a plurality of recesses of at least one carrier of a biomedical device extraction assembly for performing an extraction procedure on the plurality of polymerized biomedical devices, wherein the assembly includes:
  a first biomedical device carrier comprising a plurality of recesses including a concave surface, and further comprising at least one carrier spacing member structured to provide an inter-carrier distance when the carrier spacing member is in contact with a second biomedical device carrier, each recess being structured to accommodate a single polymerized biomedical device as the polymerized biomedical device expands in size during an extraction procedure to remove an extractable component from the polymerized biomedical device, the inter-carrier distance being measured between a bottom surface of a recess of the first carrier and a top surface of a recess of a second carrier located beneath the first carrier, or being measured between the second substrate surface of the first carrier and the first substrate surface of the second carrier located beneath the first carrier;
  the second biomedical device carrier that is substantially identical to the first biomedical device carrier, the second biomedical device carrier being in contact with the carrier spacing member of the first biomedical device carrier and being arranged or stacked relative to/be first biomedical device carrier so that a convex surface of the first biomedical device carrier opposes a concave surface of a recess of the second biomedical device carrier and extends into the recess of the second biomedical device carrier to form a cavity to accommodate the polymerized biomedical device; and
  a third biomedical device carrier that is substantially identical to the first biomedical device carrier, the third biomedical device carrier being contact with the carrier spacing member of the second biomedical device carrier so that a convex surface of the second biomedical device carrier opposes a concave surface of a recess of the third biomedical device carrier and extends into the recess of the third biomedical device carrier to form a cavity to accommodate the polymerized biomedical device; and
 contacting the plurality of polymerized biomedical devices with a liquid extraction composition to remove an extractable component from the polymerized biomedical devices to produce a plurality of extracted polymerized biomedical devices.

32. The method of claim 31, wherein the contacting comprises directing the liquid extraction composition laterally across the polymerized biomedical devices.

33. The method of claim 31, wherein the contacting comprises directing the liquid extraction composition through a single inlet port and outlet port of a storage tank containing the extraction assembly.

34. The method of claim 31, wherein the polymerized biomedical devices are polymerized ophthalmic lenses.

35. The method of claim 34, wherein the polymerized ophthalmic lenses are silicone hydrogel contact lenses.

36. The method of claim 31, further comprising contacting the plurality of extracted polymerized biomedical devices with an aqueous composition to hydrate the extracted polymerized biomedical devices.

37. The biomedical device carrier assembly of claim 1, wherein the first carrier comprises a single component with the plurality of recesses integrally formed with the substantially planar substrate.

38. The biomedical device carrier assembly of claim 1, wherein the first carrier and second carrier are configured to allow a plurality of biomedical devices to be extracted simultaneously in a single volume of extraction liquid.

39. The biomedical device extraction assembly of claim 15, wherein the first carrier, the second carrier and the third carrier are configured to allow a plurality of biomedical devices to be extracted simultaneously in a single volume of extraction liquid.

40. The method according to claim 31, wherein the first carrier, the second carrier and the third carrier are configured to allow a plurality of biomedical devices to be extracted simultaneously in a single volume of extraction liquid.

* * * * *

UNITED STATES PATENT AND TRADEMARK OFFICE
CERTIFICATE OF CORRECTION

| | | |
|---|---|---|
| PATENT NO. | : 7,811,503 B2 | |
| APPLICATION NO. | : 11/737047 | |
| DATED | : October 12, 2010 | |
| INVENTOR(S) | : Jay Scott Daulton | |

It is certified that error appears in the above-identified patent and that said Letters Patent is hereby corrected as shown below:

In column 11, line 56, in claim 10, delete "an" and insert -- angle --, therefor.

In column 14, line 1, in claim 31, delete "to/be" and insert -- to the --, therefor.

In column 14, line 10, in claim 31, after "being" insert -- in --.

Signed and Sealed this
Eighth Day of February, 2011

David J. Kappos
*Director of the United States Patent and Trademark Office*